United States Patent [19]

Cyphelly

[11] 3,980,001

[45] Sept. 14, 1976

[54] REVERSING VALVE OPERATED BY A PILOT VALVE

[76] Inventor: Ivan Jaroslav Cyphelly, Forchstrasse 968, 8128 Hinteregg, Switzerland

[22] Filed: July 17, 1974

[21] Appl. No.: 489,386

[30] Foreign Application Priority Data

Aug. 8, 1973 Switzerland ........................ 11489/73

[52] U.S. Cl. .................................... 91/420; 91/446; 91/448; 137/106; 137/596.15; 137/596.18; 137/625.63; 137/625.68

[51] Int. Cl.$^2$ .................. F15B 11/08; F15B 13/042; F16K 11/07

[58] Field of Search ............ 91/420, 446, 448, 468; 137/106, 596.18, 596.15, 625.68, 625.63

[56] References Cited

UNITED STATES PATENTS

| | | | |
|---|---|---|---|
| 2,916,879 | 12/1959 | Gondek | 91/420 |
| 2,922,400 | 1/1960 | Lorence | 137/625.68 X |
| 2,969,775 | 1/1961 | Thelen | 137/596.18 X |
| 2,989,988 | 6/1961 | Rudelick | 137/625.48 X |
| 3,013,539 | 12/1961 | Rethmeier | 137/625.63 |
| 3,459,224 | 8/1969 | Weber | 137/625.63 |
| 3,511,134 | 5/1970 | Wittren | 91/461 X |
| 3,533,440 | 10/1970 | Berry | 137/596.18 |
| 3,756,278 | 9/1973 | Melf | 137/625.63 |
| 3,811,458 | 5/1974 | Kuhnelt | 137/106 |

FOREIGN PATENTS OR APPLICATIONS

| | | | |
|---|---|---|---|
| 1,235,456 | 6/1971 | United Kingdom | 137/119 |

*Primary Examiner*—Irwin C. Cohen
*Attorney, Agent, or Firm*—Hans Berman

[57] ABSTRACT

A reversing slide valve for a hydraulic motor is operated by a pilot slide in a common valve body with the main slide, the latter being biased toward an intermediate position by springs and entraining the pilot slide when moving from the intermediate to either terminal position. Friction rings prevent movement of the pilot slide with the main slide when the latter returns to its normal intermediate position under spring bias. The pilot slide directs pressure fluid to compartments in the valve body partly bounded by end faces of the main slide in such a manner that the main slide is moved from its intermediate position into the terminal position remote from the last-occupied terminal position whenever pressure fluid is supplied to the valve after an interruption of fluid supply.

9 Claims, 2 Drawing Figures

REVERSING VALVE OPERATED BY A PILOT VALVE

Figure 1:
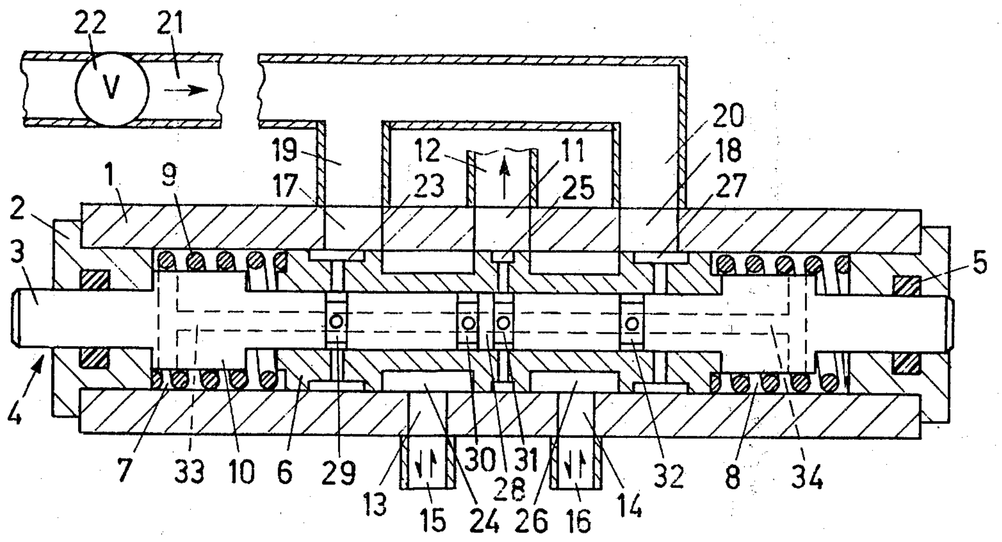

This invention relates to reversing valves of the type employed for controlling the direction of movement of double-acting hydraulic motors, and particularly to a reversing valve arrangement including a pilot valve which automatically reverses the direction of fluid flow to and from the controlled motor.

The invention is concerned more specifically with the control of a hydraulic motor which is remote from its source of pressure fluid or mounted in an inaccessible location or on a rotating machine element. Known reversing valves whose pilot valves are pressure fluid operated required two pressure lines of which one connects them to a pressure source while the other line connects them to a sump and vice versa. In the motor applications mentioned above, two pressure lines would have to be laid to the inaccessible location of the motor from the pressure source, or two rotary seals would be needed to prevent leakage from two lines alternatively under high pressure whenever the motor is operated.

The primary object of this invention is the provision of a fluid operated valve arrangement including a fluid-operated main valve and a fluid-operated pilot valve which may be located closely adjacent or on the controlled hydraulic motor in the inaccessible or rotating position of the latter, yet requires only a single high-pressure line for its operation and remote control. The signal to the pilot valve which causes the direction of flow to the controlled hydraulic motor to be reversed by the main valve is a hydraulic signal, and it is transmitted through the same, unique, high-pressure line which also supplies the operating fluid for the hydraulic motor.

With this object and others in view, the invention provides a valve arrangement in which a main slide is movable back and forth in a certain direction between a first terminal position and a second terminal position in the cavity of a valve body. The latter is formed with a supply port, a return port, and first and second pressure ports. The main slide and the valve body bound two compartments of the valve body cavity in the direction of slide movement, and the main slide seals the two compartments from each other.

The main slide is yieldably biased toward a position intermediate its terminal positions, and one of the afore-mentioned compartments increases in size when the main slide moves away from its intermediate position while the other compartment decreases in size.

A pilot slide is arranged in the valve body for reciprocating movement in the same direction as the main slide between a first end position and a second end position. Cooperating abutments on the main slide and the pilot slide are engaged for moving the pilot slide into its first end position when the main slide moves from the intermediate position into the first terminal position. The abutments also move the pilot slide into the second end position when the main slide moves from the intermediate into the second terminal position.

A braking device on the valve body impedes movement of the pilot slide with the main slide when the main slide moves from either terminal position into the intermediate position. The pilot slide defines respective conduits connecting the supply port with the two afore-mentioned compartments when the pilot slide is in its first and second end positions respectively. When the main slide is in its first terminal position, it defines a conduit connecting one pressure port to the supply port and a conduit connecting the other pressure port to the return port. When the main slide is in its second terminal position, it defines a conduit which connects the one pressure port to the return port.

Figure 2:
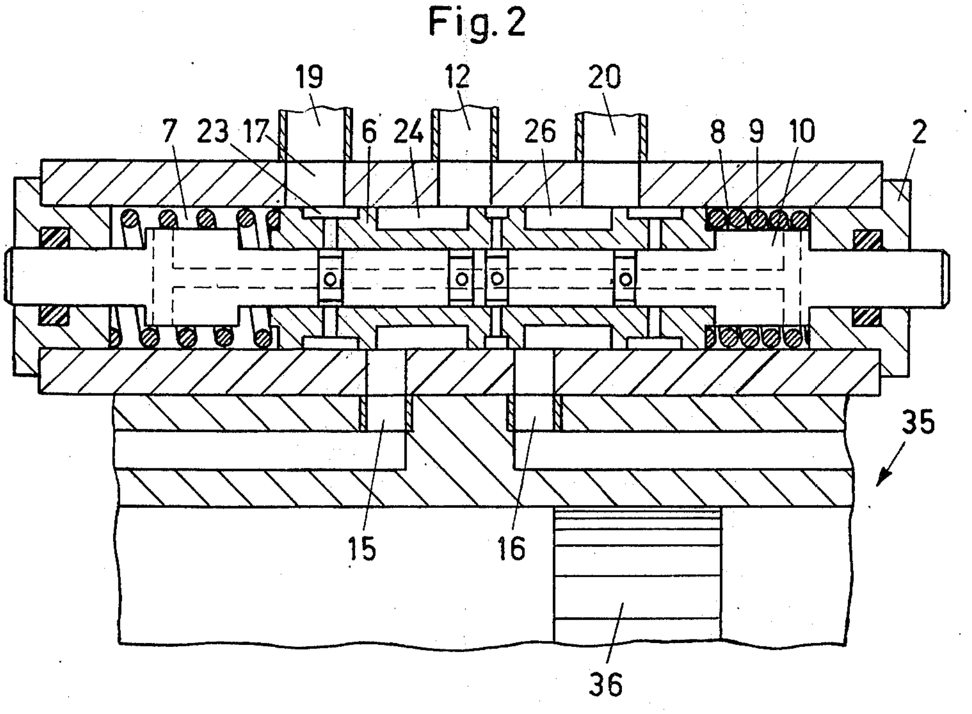

Further features, additional objects, and many of the attendant advantages of this invention will readily be appreciated as the same becomes better understood by reference to the following detailed description of a preferred embodiment when considered in connection with the appended drawing wherein:

FIG. 1 shows a slide valve arrangement of the invention in elevational section and in an idle position; and FIG. 2 illustrates the apparatus of FIG. 1 in an operative position together with a portion of a hydraulic motor controlled thereby.

Referring now to the drawing in detail, and initially to FIG. 1, there is shown a cylindrical, tubular valve body 1 whose axial ends are closed by plugs 2. Cylindrical, axially terminal guide portions 3 of a pilot slide 4 of stepped cylindrical shape are guided coaxially in the plugs 2. Sealing rings 5 in the plugs prevent loss of hydraulic fluid from the valve body 1 and engage the guide portions 3 with sufficient friction to exert a substantial braking force on the moving slide 4.

A tubular main slide 6 of stepped cylindrical shape engages the inner wall of the valve body 1 in movable sealing relationship and separates two compartments 7, 8 which are bounded axially outwardly by the plugs 2 and in axially inward direction by transverse end faces of the slide 6. Helical compression springs 9 loosely coiled in each of the two compartments about respective, enlarged abutment portions 10 of the auxiliary slide 4 bias the main slide 6 toward the illustrated, axially centered, closing or inoperative position.

The valve body 1 is formed with five, axially spaced, radial ports symmetrically distributed about the axial midpoint of the valve body. The axially central return port 11 is connected with a return line 12 leading toward a non-illustrated sump. Two axially inner ports 13, 14 are connected to a double-acting hydraulic cylinder controlled by the illustrated valve by pressure lines 15, 16 (see FIG. 2). The two outermost supply ports 17, 18 are connected by two branches 19, 20 of a supply line 21 to a non-illustrated positive displacement pump which draws liquid from the afore-mentioned sump and whose intake and discharge ducts are connected by a pressure relief valve, as is conventional. A shut-off valve 22 in the supply line 21 permits the stream of liquid from the non-illustrated pump to be interrupted momentarily or permanently, and is in the closed position when the valve is in the illustrated condition while the pump operates.

The otherwise cylindrical circumferential face of the main valve slide 6 has five circumferential grooves 23, 24, 25, 26, 27 which are axially separated from each other by lands of the cylindrical slide face and communicate, in axial sequence, with the branch line 19, the pressure line 15, the return line 12, the pressure line 16, and the branch line 20 in the illustrated idling position of the valve.

The length of the pilot slide 4 between the outer radial abutment faces of its enlarged portions 10 is somewhat smaller than the axial spacing of the inner radial abutment faces of the plugs 2, and the central portion 28 of the slide 4 extending between inner radial abutment faces of the slide portions 10 is somewhat greater than the overall length of the main slide 6. The diameter of the central portion 28 is equal to that of the guide portions 3, and the central portion 28 is axially movably received in the bore of the main slide 6 in sealing engagement with less friction than is exerted on the pilot slide 4 by the sealing rings 5.

Four annular, circumferential grooves 29, 30, 31, 32 are axially spaced in the outer face of the central portion 28 in such a manner that the center-to-center spacing of the grooves 29, 31 and that of the grooves 30, 32 equals the corresponding spacings of the groove 25 in the main slide 6 from either of the grooves 23, 27, and the spacing of the two inner grooves 30, 31 from each other in the central portion 28 is equal to the stroke of the pilot slide 3 between the position of the slide 4 shown in FIG. 1 and the position illustrated in FIG. 2. In the position of FIG. 1, one abutment portion 10 in the compartment 7 abuts against the corresponding plug 2, and the other abutment portion abuts against the main slide 6 in the compartment 8. In the position of the pilot slide seen in FIG. 2, the abutment portion 10 in the compartment 8 abuts against the associated plug 2 while the abutment portion 10 in the compartment 7 is spaced from the associated plug and abuts against the main slide 6.

Radial ducts lead inward through the main slide 6 from its grooves 23, 25, 27, and radial ducts connect the grooves 29, 30 in the pilot slide 4 with an axial bore 33 which is open toward the compartment 7, and the grooves 31, 32 are similarly connected with the compartment 8 by an axial bore 34 in the slide 4, the bores 33, 34 being sealed from each other by an imperforate portion of the slide 4.

In the illustrated condition of the valve, the branch line 19 is connected with the compartment 7 through the port 17, the groove 23, the groove 29, and the bore 33. The compartment 8 is vented to the sump through the bore 34, the grooves 31, 25, the port 11, and the return line 12.

When the valve 22 is opened, pressure fluid entering the compartment 7 from the branch line 19 shifts the main slide 6 against the restraint of one spring 9 into the position shown in FIG. 2, the pilot slide being taken along by abutting engagement of one of its enlarged sections, until movement of both slides is stopped when the abutment portion 10 strikes the plug 2 in the compartment 8.

In the resulting operative position of the valve, adequate fluid pressure in the compartment 7 is maintained by the continued communication between the supply port 17 and the groove 23, while the pressure fluid flows from the branch line 20 through the groove 26 to the pressure line 16 and to one side of a closely coupled, partly illustrated double-acting hydraulic cylinder 35 while the end of the cylinder on the other side of the associated piston 36 is vented to the return line through the pressure line 15 and the groove 24.

When the valve 22 is closed, pressure loss in the compartment 7 permits the main slide 6 to be returned to the position shown in FIG. 1 by the springs 9, while the pilot slide 4 is held fast by the braking action of the sealing rings 5. The valve reaches a position which is the mirror image of that illustrated in FIG. 1. The compartment 8 is connected to the valve 22 whereas the compartment 7 is vented to the return line 12. Upon opening of the valve 22, pressure fluid is transmitted to the hydraulic cylinder or motor 35 through the pressure line 15, while the cylinder is connected to the return line 12 through the pressure line 16.

The shut-off valve 22 may be located at any desired distance from the slide valve and may be connected with the slide valve by a single rotary seal if the slide valve is mounted on a rotating hydraulic motor. While the flow of pressure fluid fed to the motor 35 is reversed whenever the valve 22 is shut off and opened, a second reversal can be brought about by momentarily opening and closing the valve 22 without significant movement of the associated hydraulic motor so that the valve 22 also permits what amounts to interruption of hydraulic motor movement without change in direction. The slide valve may be mounted directly on the controlled hydraulic motor, as is shown in FIG. 2, so that the length of the pressure lines 15, 16 is practically zero, and only a single line 21 capable of withstanding high pressure needs to bridge the much greater distance between the slide valve and the source of pressure fluid. The fluid released from the port 11 may be collected by means of a stationary baffle or in any other simple manner if the slide valve rotates with the controlled hydraulic motor relative to the stationary valve 22.

In the position illustrated in FIG. 2, the fluid holding the main slide in its illustrated terminal position enters the valve body through the supply port 17 whereas the fluid acting on the piston 36 enters the valve body through the supply port 18, and this arrangement is preferred because it provides paths of ample flow section for both purposes without requiring a heavy valve body nor complex ducting in the same. However, for many applications, an external connection between the ports 17, 18, as shown in FIG. 1, is not needed, and a single port in the valve body may be provided with multiple orifices communicating with the grooves in the main slide 6 in an obvious manner to provide the same functions as described above. The conduits within the valve body which communicate with one supply port inherently also communicate with the other supply port through the external connection of the valve ports in the apparatus illustrated and described.

It should be understood, therefore, that the foregoing disclosure relates only to a preferred embodiment of the invention, and that it is intended to cover all changes and modifications of the example of the invention shown in the appended drawing which do not constitute departures from the spirit and scope of the invention set forth in the appended claims.

What is claimed is:

1. A valve arrangement comprising, in combination:

a. a valve body defining a cavity therein and being formed with first and second supply ports, a return port, a first pressure port, and a second pressure port, said ports communicating with said cavity for flow of pressure fluid;

b. a pressure responsive main slide valve movable back and forth in said cavity in a predetermined direction between a first terminal position and a second terminal position, said main slide valve and said valve body bounding two compartments of said cavity in said predetermined direction, said main slide valve sealing said compartments from each other;

c. yieldably resilient means continuously biasing said main slide valve toward a position intermediate said terminal positions, one of said compartments increasing in size when said main slide valve moves away from said intermediate position while the other compartment simultaneously decreases in size;

d. a pilot slide movable in said valve body in said direction between a first end position and a second end position;

e. first and second cooperating abutment means on said main slide valve and on said pilot slide engageable for moving said pilot slide into said first end position when said main slide valve moves from said intermediate position into said first terminal position, and for moving said pilot slide into said second end position when said main slide valve moves from said intermediate position into said second terminal position respectively; and f. brake means in said valve body preventing movement of said pilot slide valve with said main slide valve when said main slide moves from one of said terminal positions into said intermediate position thereby holding said pilot slide in a respective end position, first and second means on said pilot slide defining respective conduits connecting said first and second supply ports, respectively, via respective passages in said main slide valve, with said respective compartments to provide pressure fluid thereto to act on said pressure responsive main slide valve and cause movement thereof when said pilot slide is in said first and second end positions;

said main slide valve, when in said first terminal position, defining a conduit connecting one of said pressure ports to a respective one of said supply ports and a conduit connecting the other pressure port to said return port, and said main slide valve, when in said second terminal position, defining a conduit connecting said one pressure port to said return port.

2. An arrangement as set forth in claim 1, wherein said main slide valve and pilot slide have a common axis extending in said direction and are axially elongated.

3. An arrangement as set forth in claim 2, wherein said main slide valve is tubular and said pilot slide is movably received in the tubular main slide valve.

4. An arrangement as set forth in claim 3, wherein said pilot slide valve axially projects from said main slide into said compartments in all operative positions of said main slide valve and pilot slide, said abutting means including abutments on the projecting portions of said pilot slide in each of said compartments.

5. An arrangement as set forth in claim 4, wherein said projecting portions of said pilot slide are axially guided in respective bores of said valve body, said brake means including resilient members in said bores frictionally engaging the axially guided projecting portions.

6. An arrangement as set forth in claim 4, further comprising two closure means on said valve body respectively sealing said compartments in the direction on said axis, said main slide valve having end faces transverse to said axis and spaced from said closure means in said positions of said main slide valve, said projecting portions in said compartments being radially enlarged for abutting cooperation with said end faces and said closure means, whereby said radially enlarged projecting portions constitute elements of said abutment means.

7. An arrangement as set forth in claim 6, further comprising a source of fluid under pressure, a conduit connecting said source to said supply ports, and a shut-off valve in said last-mentioned conduit.

8. An arrangement as set forth in claim 7, further comprising a double-acting, fluid-operated motor including a cylinder and a piston movable in said cylinder and separating the space in said cylinder into two portions, said pressure ports permanently communicating with said portions respectively.

9. An arrangement as set forth in claim 8, wherein said main slide is tubular and has an axis extending in said direction, said pilot slide being coaxially received in said main slide for relative axial movement, said slides being axially elongated, said compartments being bounded by respective axially terminal faces of said main slide, said main slide, when in a position intermediate said first and second terminal positions, blocking said first and second pressure ports.

* * * * *